United States Patent [19]

Krude et al.

[11] 4,202,184
[45] May 13, 1980

[54] HOMOKINETIC UNIVERSAL JOINT ASSEMBLY

[75] Inventors: Werner Krude, Neunkirchen; Alfons Jordan, Hennef, both of Fed. Rep. of Germany

[73] Assignee: Uni-Cardan Aktiengesellschaft, Lohmar, Fed. Rep. of Germany

[21] Appl. No.: 935,876

[22] Filed: Aug. 23, 1978

[30] Foreign Application Priority Data

Sep. 7, 1977 [DE] Fed. Rep. of Germany ....... 2740226

[51] Int. Cl.$^2$ .......................... F16D 3/84; F16D 3/30
[52] U.S. Cl. ................................. 64/32 R; 64/32 F; 64/21; 64/4; 64/3; 403/284; 285/382
[58] Field of Search ............... 64/32 R, 32 F, 4, 3, 64/21, 7; 403/284, 134; 285/382, 256

[56] References Cited

U.S. PATENT DOCUMENTS

| | | | |
|---|---|---|---|
| 1,291,388 | 1/1919 | Bright | 285/382 |
| 3,055,100 | 9/1962 | Kimpel | 285/382 |
| 3,068,668 | 12/1962 | Buchleitner | 64/32 F |
| 3,830,083 | 8/1974 | Hadick | 64/32 F |
| 4,064,614 | 12/1977 | Horvath | 285/382 |
| 4,150,466 | 4/1979 | Horvath | 285/382 |

FOREIGN PATENT DOCUMENTS

2139666 2/1973 Fed. Rep. of Germany ........... 64/32 F

Primary Examiner—Ira S. Lazarus
Assistant Examiner—R. C. Turner
Attorney, Agent, or Firm—Toren, McGeady and Stanger

[57] ABSTRACT

A universal joint assembly including an inner joint member, an outer joint member and torque transmission means interposed therebetween is formed with a tubular drive sleeve locked in engagement about the outer peripheral portion of the outer joint member. Axially extending grooves and at least one annular or circumferential groove are formed in the outer peripheral portion of the outer joint member and the tubular drive sleeve is shaped to conform with these grooves in order thereby to effect locking engagement between the outer joint member and the sleeve. A shaping roller may be used to mold the drive sleeve into conformity with the grooved configuration of the outer joint member.

4 Claims, 8 Drawing Figures

HOMOKINETIC UNIVERSAL JOINT ASSEMBLY

BACKGROUND OF THE INVENTION

The present invention relates generally to homokinetic universal joints and more particularly to a method and structural arrangement whereby a drive sleeve may be fitted about the outer joint member of the assembly.

Homokinetic universal joint assemblies of the type to which the present invention relates are normally formed with an inner joint member and an outer joint member surrounding the inner joint member. Torque transmitting means, particularly spherical balls, are interposed between the inner and outer joint member to effect torque transmission therebetween. Grooves arranged in pairs on the outer surface of the inner joint member and complementary grooves formed on the interior of the outer joint member operate to receive therein the torque transmitting balls in operative engagement. A cage member may also be provided to support the torque transmitting balls and a tubular drive sleeve is mounted about the outer surface of the outer joint member in fixed torque-transmitting engagement.

In known homokinetic universal joints of the prior art, for example of the type described in German Pat. No. 2,121,417, axial grooves are formed in the outer surface of the outer joint member and a circumferential groove is formed in an end region which is reinforced from within. However, the axial grooves are each provided between two adjacent grooves which serve to receive the balls of the assembly. In such an outer joint member it is not possible to effect formation of additional grooves in the outer surface in the region of the grooves, inasmuch as it is rather difficult to harden the metal part because of its shape. In order to avoid such distortions from hardening, the axial grooves in such a joint as well as the circumferential grooves are arranged in the region of the reinforced end.

It will be apparent that in order to form such grooves, exact manufacturing operations are required. Also, in order to press a tubular drive sleeve into indentations for mounting the sleeve there must be utilized a pressing tool which is especially provided for the purpose involved. A further disadvantage arises by virtue of the fact that the outer diameter of the outer joint member and the inner diameter of the tubular sleeve which is to be connected thereto are subject to very narrow and exact tolerances since exact centering of the entire homokinetic universal joint will depend upon adherence to such tolerances. Deformation of the material of the drive sleeve into the grooves is effected by stretching portions of the body of the drive sleeve. In order to enable fastening of a sealing boot onto the joint assembly, an additional ring of sheet material or a pipe clamp must be provided.

In view of the foregoing, the present invention is directed toward provision of a homokinetic universal joint assembly wherein a tubular drive sleeve may be inexpensively and economically connected while simultaneously effecting fastening of a sealing boot without requiring careful consideration of diameter tolerances of the components to be connected, with joint members of different widths and with different shape of grooves being sufficiently fixed. The invention is also directed toward a method for effecting the desired connections.

SUMMARY OF THE INVENTION

In the homokinetic universal joint assembly of the invention, an inner joint member and an outer joint member having an outer peripheral portion are maintained in torque transmitting relationship by torque transmission means operatively interposed therebetween. The outer peripheral portion of the outer joint member is formed with axial grooves extending in a direction generally axially of the joint assembly. At least one annular groove is also formed in the outer peripheral portion of the outer joint member, with the annular groove or grooves extending circumferentially of the outer joint member transversely of the axial grooves. A tubular drive sleeve is shaped to conform with the configuration of the grooves in order to lock the tubular drive sleeve and the outer joint member together in torque transmitting relationship. The axial grooves are uniformly distributed over the outer peripheral portion of the outer joint member. The annular groove or grooves are formed with a depth which is greater than the depths of the axial grooves and they are arranged at approximately the mid-point of the outer peripheral portion of the outer joint member over which the axial grooves extend. An annular recess is formed in the outer peripheral portion of the outer joint member and receives therein a thickened portion of a sealing boot for the joint assembly. The sealing boot is affixed in sealing engagement between the inner and outer joint members and the tubular drive sleeve extends over the annular recess in order to fixedly mount the sealing boot on the joint assembly by compressively maintaining the thickened boot portion within the annular recess. Thus, the tubular drive sleeve serves simultaneously for the purpose of fastening the sealing boot onto the outer joint member.

In one embodiment of the invention it is considered advantageous that the grooves extend in an axial direction over the entire outer surface of the outer joint member since as a result a more economical production approach will result. Since the grooves are comparatively shallow taken relative to the cross section of the outer joint member, they may be uniformly distributed over the entire periphery even in those regions where there are formed grooves for engaging or receiving the torque transmitting balls of the joint assembly. This arrangement makes it possible to utilize a relatively economical production method involving cutting or milling operations. Also, during the hardening procedures distortions due to uniform depths of hardening may be avoided. Moreover, due to the advantageous design of the outer joint member, fastening of the sealing boot is greatly facilitated and may be performed simultaneously with mounting of the tubular drive sleeve onto the outer joint member.

In a homokinetic universal joint in which relative movement is provided between the inner joint member and the outer joint member and wherein it is necessary for the outer surface to have a relatively large width dimension, there may be provided in accordance with another feature of the invention an arrangement wherein the axial grooves may be divided into sections of equal length by a plurality of annularly extending or circumferential grooves.

In order to facilitate molding of the material of the tubular drive shaft to the annular groove of the outer joint member when the two components are to be fixed relative to each other, there is provided in accordance with another feature of the invention a configuration wherein the sidewalls of the annular groove are formed to extend at an angle which is smaller than 75° relative to the central axis of the joint assembly.

An advantage of this embodiment of the invention involves the fact that material may flow more easily from the axial grooves into the deeper annular grooves.

In accordance with a further feature of the invention the cross section of the annular groove is formed to receive a volume which corresponds to the displaced cross-sectional volume of the axial grooves.

In the method for producing the homokinetic universal joint in accordance with the invention, the outer joint member is first provided at its outer periphery with a profile of grooves, including the axial grooves and at least one annular groove, and after interconnection or nesting of the inner and outer joint members, a generally cylindrical tubular drive sleeve blank having a generally smooth inner surface and an inner diameter larger than the outer diameter of the outer joint member is placed over the outer joint member and is molded so that the material of the tubular blank flows into the axial grooves of the outer joint member. In accordance with the invention it is provided that portions of the material of the tubular sleeve flow simultaneously into the axial grooves and into the at least one annular groove with the molding operation being performed by means of an essentially cylindrical roller which is applied while the joint rotates. Reduction in diameter is selected in such a way that the annular grooves are filled by the displaced material volume of the tubular member.

It is found that in the application of the method of the invention it is advantageous to utilize a standard tool such as, for example, a cylindrical roller and it is possible to effect the assembly procedure without the requirement of stringent consideration of tolerances of the components relative to each other. During the rotation which is effected in the process of performing the assembly operation, the material will flow as a result of roller pressure from the axially extending grooves into the annular grooves so that a firm and reliable fixing of the two components relative to each other may be achieved. The introduction of portions of material of the tubular shaft into the axially extending grooves as well as into the annular groove results in an interlocking connection which prevents any relative movement between the outer joint member and the tubular drive shaft affixed thereto.

The various features of novelty which characterize the invention are pointed out with particularity in the claims annexed to and forming a part of this disclosure. For a better understanding of the invention, its operating advantages and specific objects attained by its use, reference should be had to the accompanying drawings and descriptive matter in which there are illustrated and described preferred embodiments of the invention.

DETAILED DESCRIPTION OF THE PREFERRED EMBODIMENT

Figure 1:
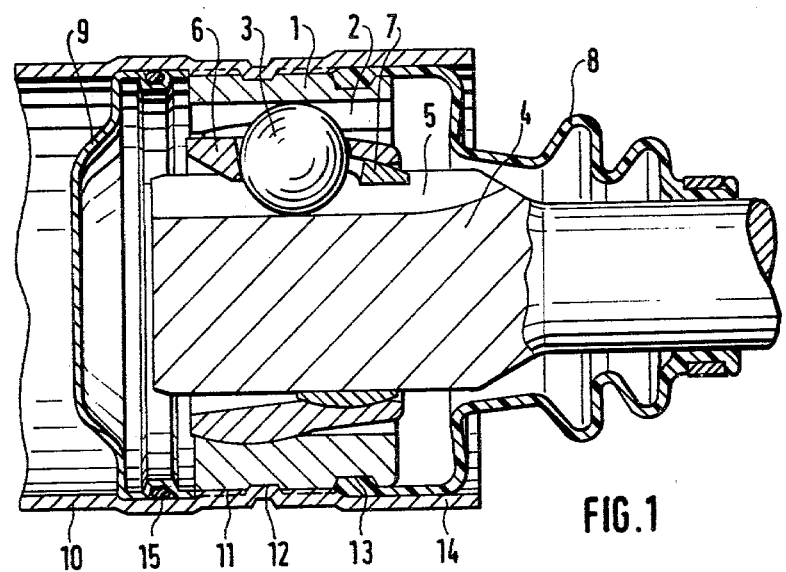
FIG. 1 is a sectional view of a homokinetic universal joint assembly in accordance with the present invention.

Referring now to the drawings wherein similar parts are identified with like reference numerals throughout the various figures thereof, a homokinetic universal joint assembly in accordance with the present invention is shown in FIG. 1 as essentially consisting of an outer joint member 1 having internal grooves 2 arranged for receiving therein torque transmitting means such as balls 3 operating to effect torque transmission between the outer joint member 1 and an inner joint member 4 located within the outer joint member 1. Grooves 5 formed on the outer periphery of the inner joint member 4 are also adapted to operatively receive therein the torque transmitting balls 3.

In order to control the balls 3 in the angle-bisecting plane during bending of the joint, the balls are guided in a cage 6. The cage 6 includes an outer spherical surface whereby it is, in turn, guided in a similarly shaped spherical surface of the outer joint member 1 with the inner surface thereof being guided on a control member 7 which is structured as a separate component of the assembly.

In order to seal the interior of the joint against contamination, there is provided on one side thereof a sealing boot 8 and on the opposite side of the joint there is provided a locking cap 9.

Mounted about the outer joint member 1 in locking engagement therewith is a tubular drive sleeve 10 which is constructed essentially as a drive shaft and which is connected upon the outer peripheral portion of the outer joint member 1 in fixed engagement. In order to effect the interlocking or fixed mounting of the sleeve 10 upon the outer joint member 1, the outer periphery of the outer joint member 1 is formed with axial grooves 11 which extend in an axial direction of the joint assembly, the grooves 11 serving to effect an interconnection between the sleeve 10 and the joint member 1 whereby the members are rotatively fixed relative to each other.

In order to effect fixing or locking of the members relative to each other in the axial direction the outer surface of the outer joint member 1 is provided with an annular groove 12 which extends circumferentially about the joint member 1.

In order to enable fastening of a sealing boot 8 upon the joint assembly in a relatively simple and convenient manner, the corresponding end of the outer joint member 1 is formed with an annular step or recess 13 on its outer surface. The sealing boot 8 is formed with a thickened portion extending annularly thereabout at one end thereof which is compressed within the recess 13 by the drive sleeve 10. In the embodiment shown in FIG. 1, the tubular drive sleeve 10 is provided with a projection 14 which extends beyond the end face of the joint member 1 and which serves to absorb centrifugal forces which are generated by lubricant in the sealing boot 8. In this embodiment, a locking cap 9 is simultaneously affixed by means of a single assembly step at the opposite end of the joint assembly and, additionally, a sealing ring 15 may be used in order to insure a reliable sealing effect.

Figure 2:
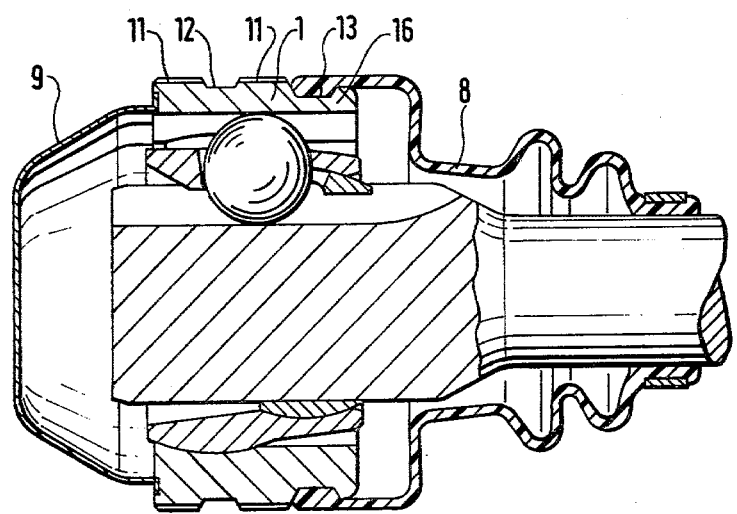
FIG. 2 is a sectional view of a universal joint assembly of the type depicted in FIG. 1 but shown prior to attachment thereto of the tubular drive sleeve.

In FIG. 2, the homokinetic universal joint assembly of the invention shown in FIG. 1 is depicted prior to placement of the tubular drive sleeve 10. An additional difference between the structure depicted in FIGS. 1 and 2 is that in the structure of FIG. 2 a differently designed locking cap 9 is provided. As will be seen from FIG. 2, the outer surface of the outer joint member 1 has formed therein the axial grooves 11 which essentially comprise milled formations extending over the entire length of the member 1. Located at approximately the mid-point of the axially extending grooves is the annular groove 12 which is formed to extend over the entire circumference of the member 1. The annular step or recess 13 which receives the thickened fastening end of the sealing boot 8 is formed in a manner whereby the outer diameter of the mounted sealing boot 8 is not significantly larger than the outer diameter of the outer joint member 1. This insures that the sealing boot 8 will be affixed in place with accuracy. The fixing of the boot 8 is reinforced by the provision of an annular projection 16 which defines the outer side of the recess 13.

Figure 3:
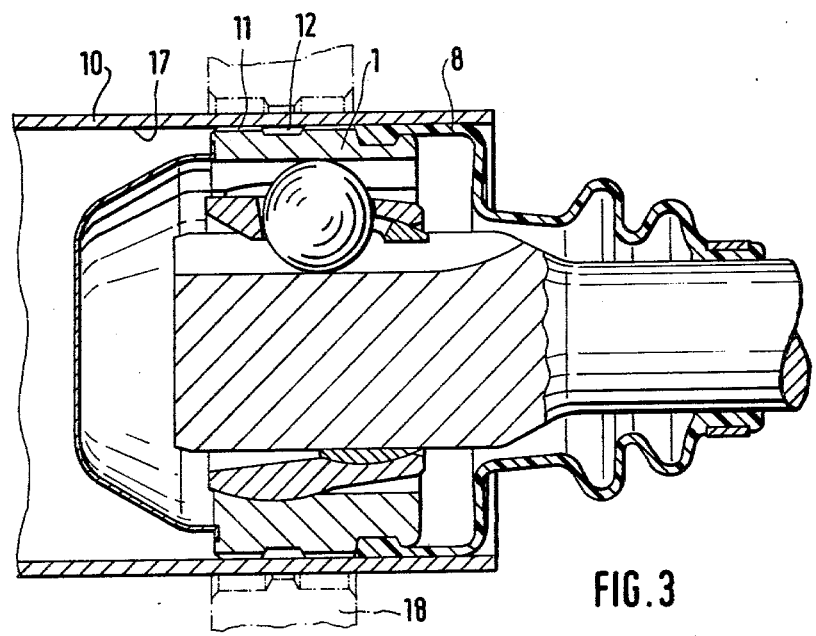
FIG. 3 is a sectional view of a joint assembly in accordance with the present invention showing the tubular drive sleeve in place about the outer joint member but prior to affixation thereof.

FIG. 3 depicts a joint in accordance with that shown in FIG. 2 except that the tubular drive sleeve 10 is shown in its undeformed condition after it has been placed over the outer diameter of the outer joint member 1 with the thickened portion of the sealing boot 8 having first been installed in place within the recess 13. As will be seen from FIG. 4, the sleeve 10 is developed from an essentially cylindrical tubular blank having a smooth, unworked inner surface 17 which, independent of tolerances and with a certain degree of play or clearance, is dimensioned to receive therein the outer joint member 1. When the outer joint member 1 and the tubular shaft 10 are positioned relative to each other in the manner indicated, the assembly procedure may proceed by utilization of a molding tool 18, shown schematically in FIG. 3, which may be operated to mold or otherwise deform the blank 10 shown in FIG. 3 so that a tubular driving sleeve may be attached to the member 1 by conforming the shape of the sleeve with the shape of the outer surface of the outer joint member 1, with the sleeve fitting into the grooves 11 and 12.

Figure 4:
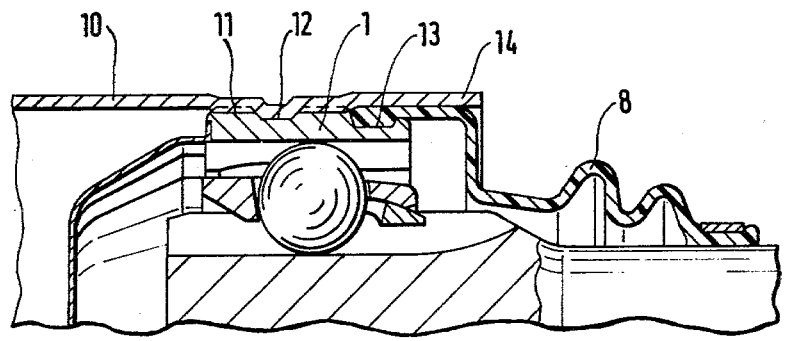
FIG. 4 is a sectional view of a portion of a universal joint assembly in accordance with the present invention depicting the tubular drive sleeve in assembled condition on the outer joint member.

FIG. 4 shows the sleeve 10 after it has been deformed in accordance with the method of the invention with the material of the sleeve 10 having been molded into conformance with the shapes of the axial grooves 11 and the annular groove 12. Accordingly, the axial grooves 11 will then operate to effect a connection between the tubular sleeve 10 and the outer joint member 1 which is rigid against relative rotation of the members with axial fixing of the members relative to each other being provided by the annular groove 12. The sealing boot 8 is protected from centrifugal forces by the extension 14 which prevents the sealing boot 8 from being radially outwardly displaced and the sealing boot is fastened with its thickened end within the recess 13.

Figure 5:
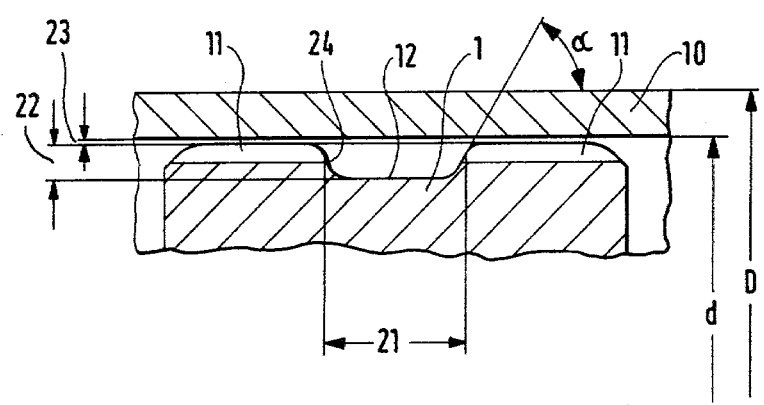
FIG. 5 is a more detailed sectional view of a portion of a joint assembly showing the tubular driving sleeve prior to its being molded into conformity with the configuration of the outer joint member.
Figure 6:
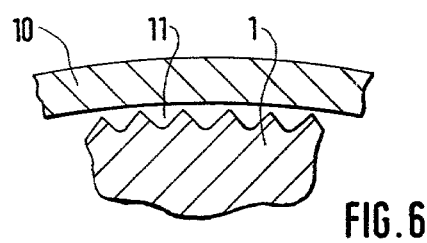
FIG. 6 is a sectional view taken transversely of the view of FIG. 5 showing the sectional configuration of the axial grooves.

FIGS. 5 and 6 depict the outer joint member 1 and the tubular sleeve 10 on an enlarged scale with greater detail. The axial grooves 11 extend over the entire outer surface of the joint member 1 and have, as seen in FIG. 6, a constant spacing between each other. As indicated, the grooves may be produced by a milling operation.

The lengths of the axial grooves 11 are interrupted by the annular groove 12 which extends in the circumferential direction. The annular groove 12 is arranged approximately in the center of the outer surface of the outer joint member 1 so that the axial grooves 11 extend over an equal distance on both sides of the groove 12 with approximately equivalent lengths. The annular groove 12 is formed with a cross section which is defined by the width 21 and the depth 22. The cross section of the annular groove 12 is dimensioned in such a way that it may receive those portions of the material which consist of the diameter reduction of the tubular sleeve 10 and the material volume displaced by the toothed portion. Before it is molded, the tubular shaft 10 is provided with a play or clearance relative to the outer joint member 1. The magnitude of the clearance 23 is independent of the components per se, and only the cross section of the annular grooves 12 need be adjusted to this clearance since a different diameter reduction must be expected. In order to achieve an especially favorable flow behaviour of the material of the tubular sleeve 10 into the annular groove 12, the sidewalls 24 of the annular groove 12 are formed to extend relative to the central axis of the homokinetic joint at an angle α which is smaller than 75°.

Figure 7:
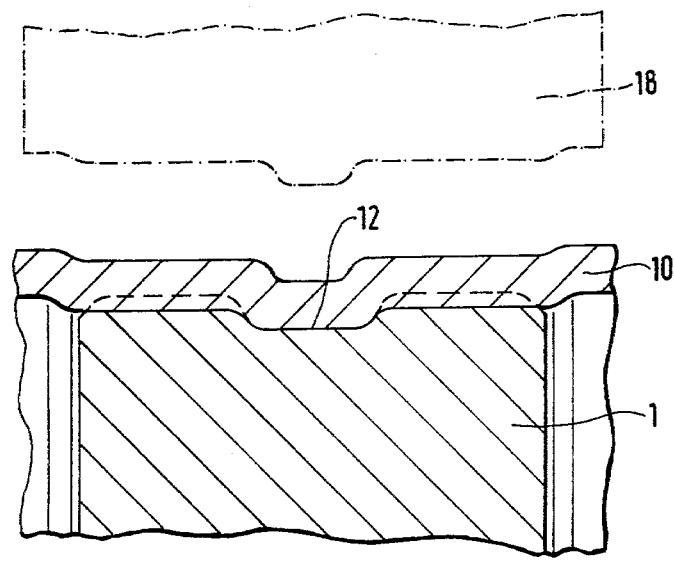
FIG. 7 and 8 are axial views depicting steps in the method of affixing the tubular sleeve onto the outer joint member.
Figure 8:
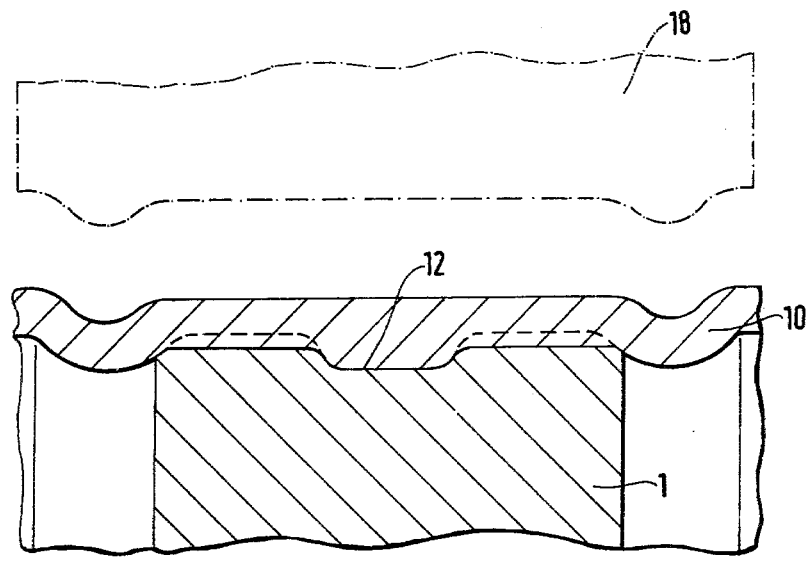

FIGS. 7 and 8 schematically depict in principle the molding operation which is performed upon the tubular sleeve 10 in order to conform it with the shape of the outer joint member 1. In FIG. 7, the material is first molded into the annular groove 12 whereby a flow of the material occurs starting from the annular groove 12 toward the two end faces of the outer joint member 1. The molding tool 18, shown schematically, may in this case be constructed as a roller, in which case the tool is operated by a rotative motion. Alternatively, the tool may be constructed as a pressing tool. On the other hand, in FIG. 8, first the material of the tubular sleeve 10 is molded at the end faces of the outer joint member 1 toward the central axis so that two grooves each are produced. In this embodiment, due to the diameter reduction, flowing of the material of the tubular sleeve 10 into the annular groove 12 takes place, the flowing starting from the end faces. In this case, it is also possible that the molding tool 18 which is used may be selected either to be a roller or a pressing tool. In both embodiments it will be seen that a connection which is tight and rigid against rotation as well as against axial relative movement will be effected in a relatively reliable manner.

The use of a member such as the tubular sleeve 10 is generally independent of the type of joint involved. Thus, it will be seen that the invention may be applied in joints other than the types depicted in FIGS. 1-5.

While specific embodiments of the invention have been shown and described in detail to illustrate the application of the inventive principles, it will be understood that the invention may be embodied otherwise without departing from such principles.

What is claimed is:

1. A homokinetic universal joint assembly comprising: an inner joint member; an outer joint member having an outer peripheral portion; torque transmission means interposed between said inner and outer joint members to effect torque transmission therebetween;

means supporting said torque transmission means in operative engagement between said inner and outer joint members; a tubular drive sleeve locked in engagement about said outer peripheral portion of said outer said joint member; a sealing boot affixed in sealing engagement between said inner and outer joint members, said sealing boot including a thickened portion at one end thereof; axial grooves formed in said outer peripheral portion of said outer joint member and extending generally axially of said joint assembly; at least one annular groove formed in said outer peripheral portion of said outer joint member extending circumferentially thereof transversely of said axial grooves; said tubular drive sleeve being shaped to conform with the configuration of said axial grooves and said at least one annular groove to lock said tubular drive sleeve in fixed engagement relative to said outer joint members; said axial grooves being uniformly distributed over said outer peripheral portion, said at least one angular groove having a depth which is greater than the depth of said axial grooves and being arranged at approximately the mid-point of said outer peripheral portion of said outer joint member over which said axial grooves extend; and an annular recess formed in said outer peripheral portion of said outer joint member receiving therein said thickened portion of said sealing boot, said tubular drive sleeve being formed to extend over said annular recess to fixedly mount said sealing boot on said joint assembly.

2. An assembly according to claim 1 wherein a plurality of annular grooves are formed in said outer peripheral portion of said outer joint member, said plurality of grooves being arranged to divide said axial grooves into sections of equal length.

3. An assembly according to claim 1 wherein said at least one annular groove is formed with side walls extending circumferentially of said outer joint member and arranged to extend at an angle of less than 75° relative to the center axis of said joint.

4. An assembly according to claim 1 wherein said at least one annular groove has a cross section which can receive a volume which corresponds to the displaced cross-sectional volume of said axial grooves.

* * * * *